(12) United States Patent
Hisai

(10) Patent No.: US 11,859,650 B2
(45) Date of Patent: Jan. 2, 2024

(54) GEAR DEVICE

(71) Applicant: Enplas Corporation, Saitama (JP)

(72) Inventor: Koki Hisai, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/705,435

(22) Filed: Mar. 28, 2022

(65) Prior Publication Data

US 2022/0307536 A1 Sep. 29, 2022

(30) Foreign Application Priority Data

Mar. 29, 2021 (JP) ................................. 2021-055881

(51) Int. Cl.
| | | |
|---|---|---|
| *F16B 21/18* | (2006.01) | |
| *F16H 57/08* | (2006.01) | |
| *F16H 57/025* | (2012.01) | |
| *F16H 57/02* | (2012.01) | |

(52) U.S. Cl.
CPC ........... *F16B 21/18* (2013.01); *F16H 57/025* (2013.01); *F16H 57/08* (2013.01); *F16H 2057/02034* (2013.01)

(58) Field of Classification Search
CPC ........ F16B 21/18; F16H 57/025; F16H 57/08; F16H 2057/02034
USPC .......................................................... 475/11
See application file for complete search history.

(56) References Cited

U.S. PATENT DOCUMENTS

| | | | | |
|---|---|---|---|---|
| 4,838,123 | A | | 6/1989 | Matoba |
| 5,240,462 | A | * | 8/1993 | Mochizuki ............ F16H 1/2863 475/341 |
| 5,409,430 | A | * | 4/1995 | Hashimoto ........... F16H 1/2863 475/331 |
| 5,593,360 | A | * | 1/1997 | Ishida ..................... F16H 55/17 475/331 |
| 5,651,747 | A | * | 7/1997 | Minegishi .............. H02K 7/116 475/176 |
| 6,255,751 | B1 | * | 7/2001 | Hoffmann .............. H02K 11/21 310/40 MM |
| 6,585,620 | B1 | * | 7/2003 | Bae ........................... F16H 1/46 475/331 |
| 8,133,143 | B2 | * | 3/2012 | Schoon ................... B60T 1/062 475/5 |
| 9,303,727 | B2 | * | 4/2016 | Reimann ............... F16H 57/082 |
| 11,166,410 | B1 | * | 11/2021 | Bonny .................... A01D 34/69 |
| 2002/0130006 | A1 | * | 9/2002 | Nakamura .............. B25B 21/00 173/217 |
| 2011/0036605 | A1 | * | 2/2011 | Leong ..................... B25F 5/001 173/47 |
| 2011/0196375 | A1 | * | 8/2011 | Li ........................... H02K 7/116 475/275 |
| 2020/0018382 | A1 | * | 1/2020 | Momose .................. G01D 5/34 |

FOREIGN PATENT DOCUMENTS

JP             06-074835            9/1994

* cited by examiner

*Primary Examiner* — Colby M Hansen

(57) ABSTRACT

A gear device includes: a housing cover having an annular shape and including a center opening configured to dispose a connection shaft for a gear, the housing cover being disposed at one end portion of a housing in an axis direction, the housing having a cylindrical shape and configured to house the gear. At an outer surface of the housing cover, an assembling mechanism configured to detachably assemble another housing cover is provided.

7 Claims, 7 Drawing Sheets

GEAR DEVICE

CROSS REFERENCE TO RELATED APPLICATIONS

This application claims the benefit of priority of Japanese Patent Application No. 2021-055881 filed on Mar. 29, 2021, the contents of which are incorporated herein by reference in their entirety.

TECHNICAL FIELD

The present invention relates to a gear device.

BACKGROUND ART

As disclosed in Japanese Examined Patent Publication No. H6-74835 (hereinafter referred to as PTL 1), a planetary gear is known as a gear device used as a decelerator that decelerates the input rotation and outputs it in various machines such as an automobile and a robot. The planetary gear device disclosed in PTL 1 houses components such as a sun gear, an inner gear, and a carrier in a housing. A disc plate provided with an opening where the shaft part of the motor is inserted is attached at one end portion side of the housing. The planetary gear device is fixed to the motor by inserting a motor shaft part protruded from the end surface of the motor to the opening, joining the disc plate and the end surface of the motor, and using a fastening member such as a bolt or the like.

CITATION LIST

Patent Literature

PTL 1
Japanese Examined Patent Publication No. H6-74835

SUMMARY OF INVENTION

Technical Problem

Incidentally, in the above-mentioned known planetary gear device, the opening for insertion of the motor shaft is provided at the one end surface side of the housing, and as such dust may intrude depending on the conveyance state when the planetary gear device is conveyed alone.

In view of this, during conveyance of the planetary gear device, it is necessary to close the opening with another member to prevent intrusion of dust into the planetary gear device by attaching a cap for sealing the opening at the one end surface side, for example. Therefore, there has been a desire for a simpler method for preventing intrusion and mixture of foreign matters.

An object of the present invention is to provide a gear device that can be conveyed while preventing intrusion and mixture of foreign matters.

Solution to Problem

To achieve the above-mentioned object, a gear device according to an embodiment of the present invention includes: a housing cover having an annular shape and including a center opening configured to dispose a connection shaft for a gear, the housing cover being disposed at one end portion of a housing in an axis direction, the housing having a cylindrical shape and configured to house the gear. At an outer surface of the housing cover, an assembling mechanism configured to detachably assemble another housing cover is provided.

Advantageous Effects of Invention

According to the embodiment of the present invention, it is possible to provide a gear device that can be conveyed while preventing intrusion and mixture of foreign matters.

DESCRIPTION OF EMBODIMENTS

An embodiment of the present invention is elaborated below with reference to the accompanying drawings.

Figure 1:
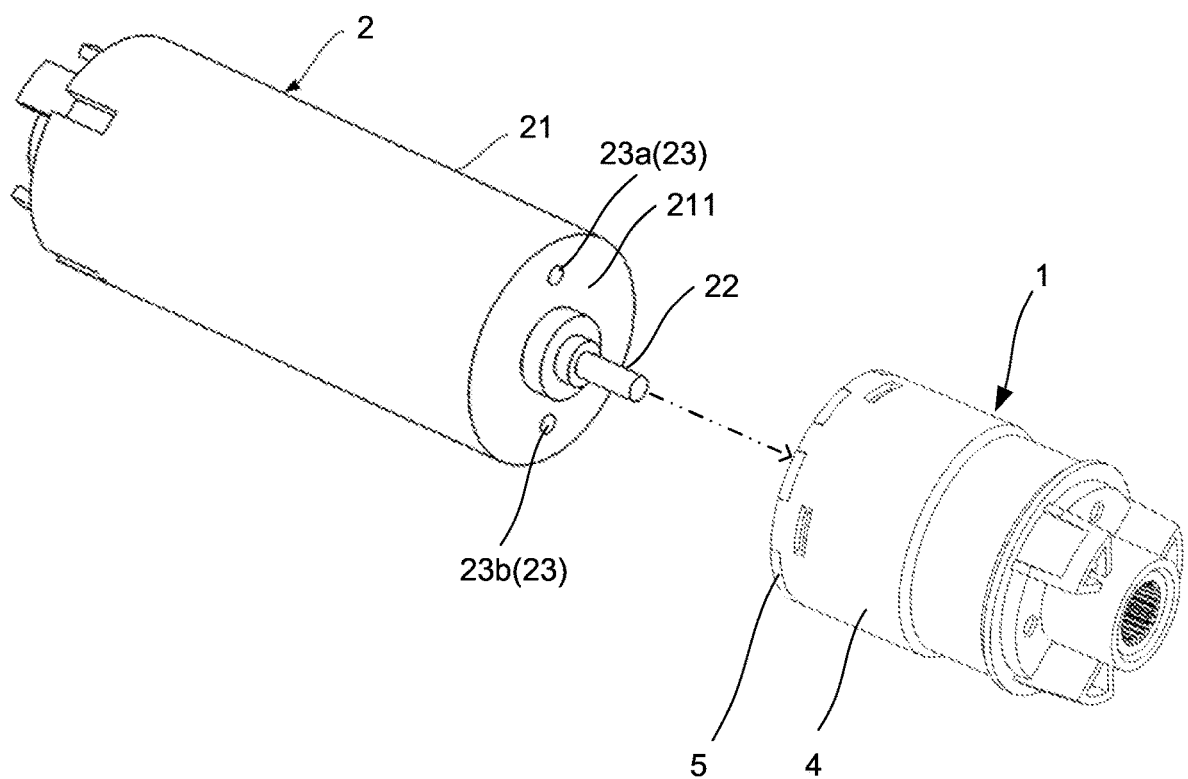
FIG. 1 is a perspective view illustrating a state where a gear device of an embodiment of the present invention is used.
Figure 2:
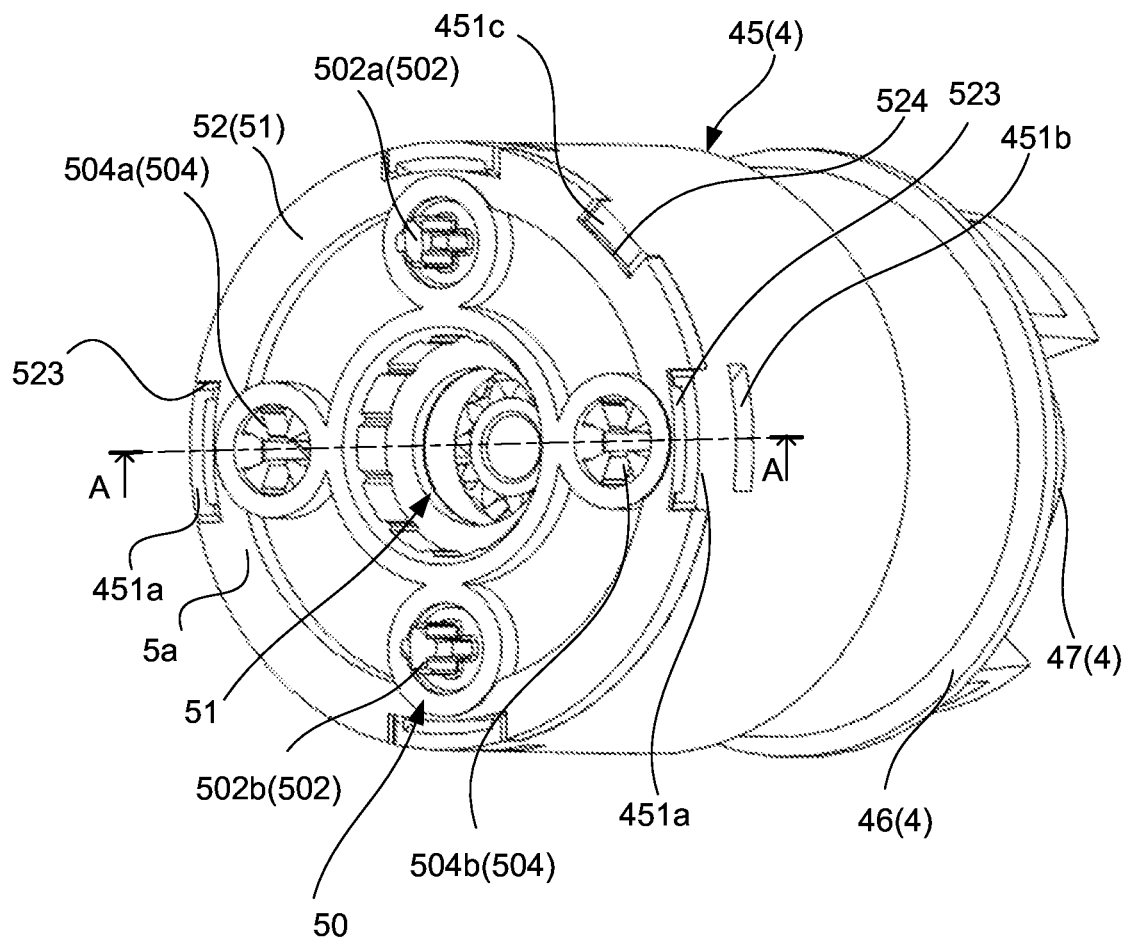
FIG. 2 is a rear perspective view of the gear device of the embodiment of the present invention.
Figure 3:
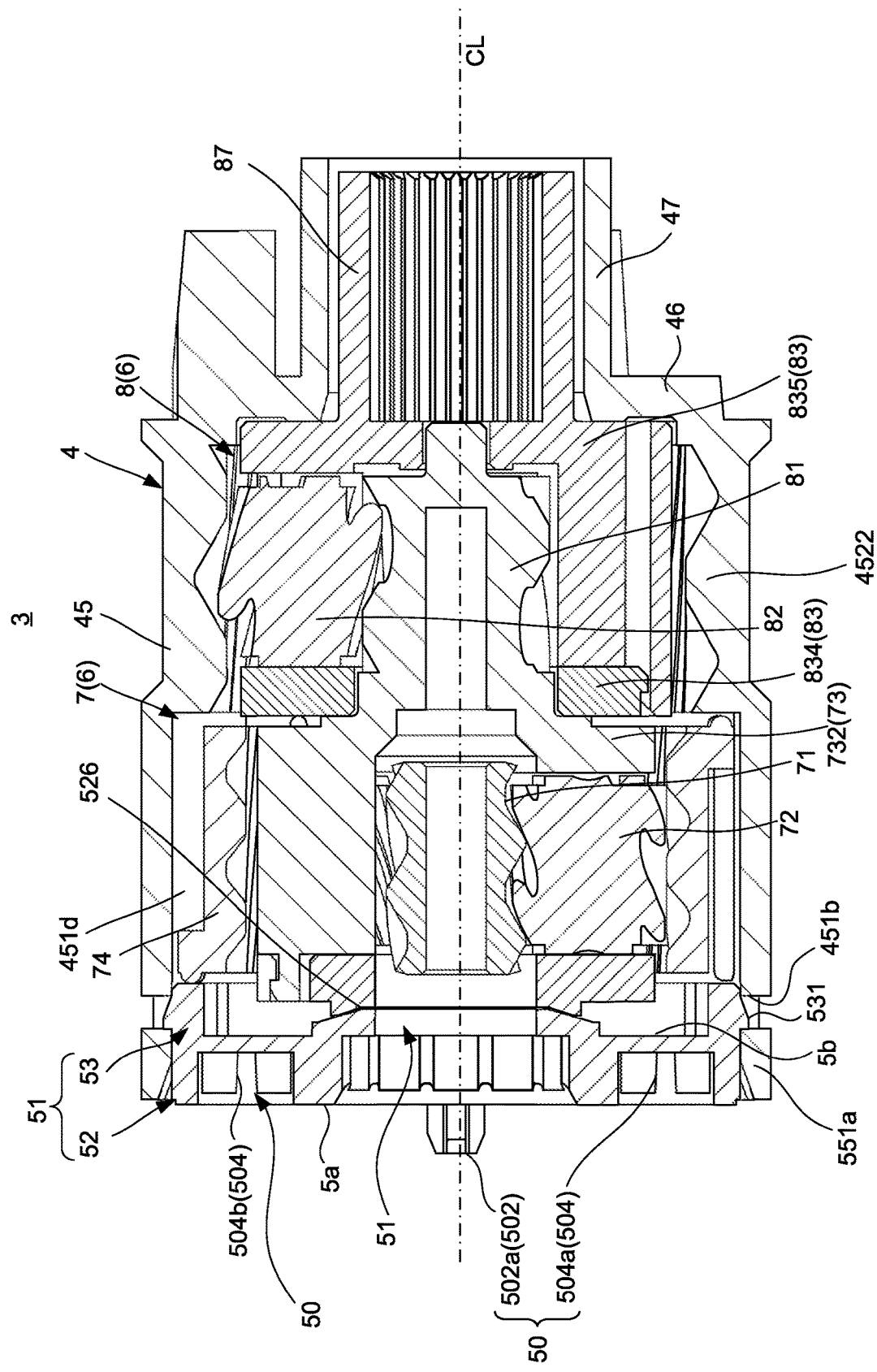
FIG. 3 is a longitudinal sectional view of the gear device taken along the axis direction.
Figure 4:
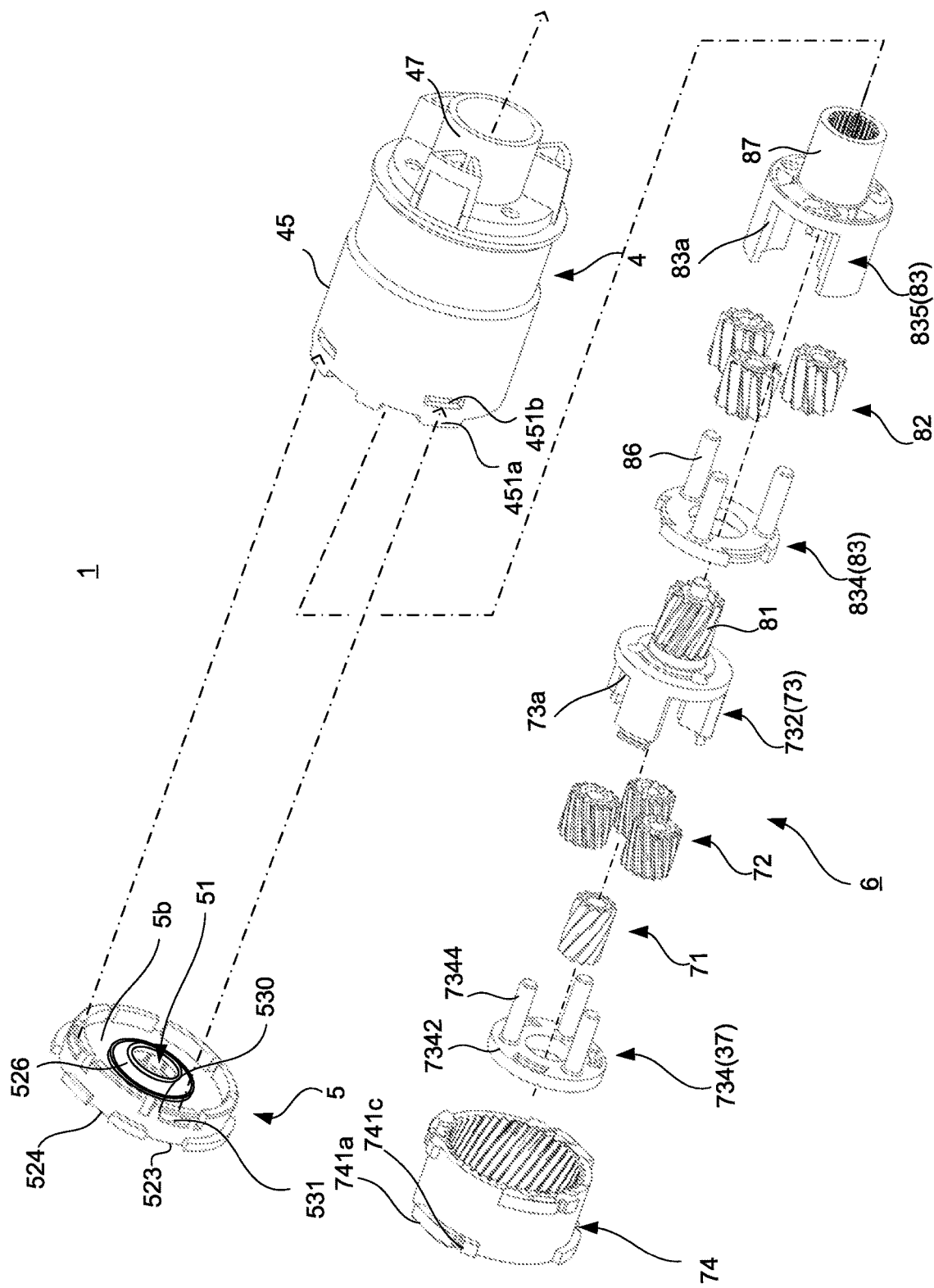
FIG. 4 is an exploded perspective view of the gear device of the embodiment of the present invention.

FIG. 1 is a perspective view illustrating a state where a gear device of an embodiment of the present invention is used, FIG. 2 is a rear perspective view of the gear device, and FIG. 3 is a longitudinal sectional view of the gear device taken along the axis direction. FIG. 4 is an exploded perspective view of the gear device of the embodiment of the present invention.

In the following description, the horizontal direction in FIGS. 1 and 3 is referred to as axial direction. In addition, the left direction in FIGS. 1 and 3 is referred to as one side in the axial direction, and the right direction is referred to as the other side in the axial direction. Unless otherwise noted, the axial direction means the axis direction of each member that makes up the gear device.

In addition, the direction orthogonal to the axial direction in FIGS. 1 and 3 is referred to as radial direction. Unless otherwise noted, the radial direction means the radial direction of each member that makes up the gear device. The outside in the radial direction means a direction away from center of each member that makes up the gear device in the radial direction. The inside in the radial direction means a direction approaching toward the center of each member that makes up the gear device in the radial direction. In addition, in FIGS. 1 and 3, the direction around the central axis of the gear device that is parallel to the axial direction is referred to as circumferential direction. Unless otherwise noted, the circumferential direction means the circumferential direction of each member that makes up the planetary gear device.

Gear device 1 illustrated in FIGS. 1 to 4 is attached to motor 2, and makes up actuator 10.

Motor 2 includes motor body 21 and rotation shaft 22. Motor 2 operates under the control of a control part (not illustrated in the drawing), and drives gear device 1 by rotating rotation shaft 22.

At the end surface on the other side in the axial direction (the right end surface in FIG. 1), motor body 21 includes support surface 211 for supporting gear device 1. Motor body 21 includes, at support surface 211, a plurality of (two, in the present embodiment) motor side fixation holes 23a and 23b. Rotation shaft 22 is a connection shaft connected to gear mechanism (for example, described later planetary gear mechanism) 6 in gear device 1.

Fixation holes 23a and 23b are, for example, motor side engagement parts that engage with gear side engaging parts 502a and 502b of gear device 1 when gear device 1 is attached to motor 2. At support surface 211, fixation holes 23a and 23b are provided at even intervals (at 180° intervals) in the circumferential direction. Gear device 1 is fixed to motor 2 by engaging fixation holes 23a and 23b with protruding gear side engaging parts 502a and 502b provided in gear device 1 illustrated in FIGS. 2 and 3. Gear device 1 is fixed to motor 2 by pressing gear side engaging parts 502a and 502b into motor side fixation hole 23 (23a, 23b). Motor 2 is a member for supporting gear device 1 described later. Note that the type of the motor is not limited, and various electric motors known in the related art may be employed.

Gear device 1 is, for example, a planetary gear device. For example, gear device 1 is attached to motor 2, and is used as an actuator of an electric back door of an automobile used for opening and closing the back door of actuator 1. While gear device 1 is described as a planetary gear device in the following description, gear device 1 may include any gear mechanism as long as gear device 1 is driven by being connected with rotation shaft 22 inserted from the outside via a through hole.

Gear device 1 outputs the rotation input from motor 2 after decelerating it at a predetermined deceleration ratio. Gear device 1 includes housing 4 that houses the planetary gear mechanism as gear mechanism 6, and housing cover 5 disposed at an end portion on one end portion side in the axis direction (one end portion in the axial direction) of housing 4.

Housing 4

In the present embodiment, housing 4 houses gear mechanism 6 together with housing cover 5 and achieves the deceleration of multiple stages. In housing 4, gear mechanism 6 decelerates, in two stages, the rotation of rotation shaft 22 under the drive of the motor 2 and outputs it from shaft connecting part 87.

Housing 4 is a cylindrical member that is open at an end portion on one side in the axial direction where housing cover 5 is attached. In housing 4, annular part 46 including support cylindrical part 47 is joined at the end portion on the other side in the axial direction of body cylindrical part 45 with a cylindrical shape. For example, it is preferable that housing 4 be made of synthetic resin, and that body cylindrical part 45 be shaped integrally with annular part 46 including support cylindrical part 47 by injection molding.

Body cylindrical part 45 has a cylindrical shape and houses gear mechanism 6 inside. In body cylindrical part 45, engaging protrusion 451a and housing engaging hole 451b are provided at one end portion, which is the end portion on one side in the axial direction.

Engaging protrusion 451a extends in the axial direction at plural positions in the circumferential direction of the opening edge of one end portion of body cylindrical part 45. When one end portion of body cylindrical part 45 is fitted on housing cover 5 from the outside, engaging protrusion 451a engages with engaging recess 523.

A plurality of (four, in the present embodiment) housing engaging holes 451b extends in the circumferential direction at one end portion of body cylindrical part 45. Housing engaging hole 451b is formed in a slit shape extending in the circumferential direction. Housing engaging hole 451b engages with engaging claw part 531 of housing cover 5 when fitted on connection cylindrical part 53 of housing cover 5 from the outside.

When engaging protrusion 451a and housing engaging hole 451b engage with engaging recess 523 of housing cover 5 and engaging claw part 531 of housing cover 5, respectively, key protrusion 451c engages with cutout part 524.

In housing 4, the movement in the axial direction and the circumferential direction with respect to housing cover 5 is limited through the engagement of housing engaging hole 451b and engaging claw part 531. In addition, in housing 4, the movement in the circumferential direction with respect to connection cylindrical part 53 is limited through the engagement of engaging protrusion 451a and engaging recess 523. In addition, in housing 4, housing cover 5 can be assembled to a predetermined position through the engagement key protrusion 451c and cutout part 524.

Body cylindrical part 45 houses first planetary gear mechanism 7 and second planetary gear mechanism 8 in order from one side in the axial direction (the left side in FIG. 3) to the other side (the right side in FIG. 3). Body cylindrical part 45 houses second planetary gear mechanism 8 in the state where output axis connecting part 87 is protruded from the end portion on the other side (the right side in FIG. 3) in the axis direction of body cylindrical part 45, to the other side.

At a portion facing the outer peripheral surface of first inner gear 74 described later in the radial direction at the inner peripheral surface of body cylindrical part 45, ridge 451d that engages with outer periphery groove part 741c of the outer periphery of first inner gear 74 described later in the circumferential direction extends in the axial direction. A plurality of (for example, four) ridges 451d is provided in a manner corresponding to outer periphery groove part 741c.

Ridge 451d makes point contact or line contact with outer periphery groove part 741c in a small gap in the radial direction between the inner peripheral surface of body cylindrical part 45 and the outer peripheral surface of first inner gear 74. In this manner, body cylindrical part 45 movably supports first inner gear 74 such that the axis line of first inner gear 74 is slightly tilted with respect to the central axis of body cylindrical part 45 (housing 4). That is, body cylindrical part 45 supports first inner gear 74 in a floating manner.

Body cylindrical part 45 includes second inner gear part 4522 including teeth extending in the axial direction at the inner peripheral surface on the other side in the axial direction. Second inner gear part 4522 is a helical gear, and engages with planetary gear 82 of second planetary gear mechanism 8 described later.

Note that second inner gear part 4522 may be a spur gear. In addition, a portion on the other side of body cylindrical part 45 may be interpreted as an inner gear of second planetary gear mechanism 8. In addition, the inner gear of second planetary gear mechanism 8 may be a member provided separately from body cylindrical part 45, i.e., housing 4. In this case, the second inner gear part provided at the inner peripheral surface of the inner gear provided separately from housing 4. Then, this inner gear is fixed (internally fitted) to housing 4. This inner gear may be supported by housing 4 in a floating manner, as with first inner gear 74 of first planetary gear mechanism 7 described later.

Annular part 46 has an annular shape, and is connected to the other end portion of body cylindrical part 45 in the axis direction. More specifically, the outer end portion of annular part 46 in the radial direction is provided integrally with the end portion on the other side of housing 4.

Support cylindrical part 47 has a cylindrical shape contiguous with the center opening of annular part 46, and is provided upright along the axial direction on the other side in the axial direction, i.e., the output side. Support cylindrical part 47 rotatably supports output shaft connecting part 87, with its connection port externally exposed. In this manner, the torque output by output shaft connecting part 87 can be transmitted to the external mechanism by connecting the output shaft, or the output destination member of the rotational force to output shaft connecting part 87.

Housing 4 having the above-mentioned configuration is fixed to motor 2 through housing cover 5 in the state where it is housed in gear mechanism 6.

Gear Mechanism 6

As illustrated in FIGS. 3 and 4, gear mechanism 6 is a planetary gear mechanism. Gear mechanism 6 is housed in housing 4, and outputs the rotation transmitted from motor 2 through shaft connecting part 87 after decelerating it. Gear mechanism 6 includes second planetary gear mechanism 8 and first planetary gear mechanism 7 disposed along the axis direction.

First planetary gear mechanism 7 includes sun gear 71, the plurality of planetary gears 72 disposed around sun gear 71, first carrier 73 that rotatably supports the plurality of planetary gears 72, and first inner gear 74. While it suffices that first planetary gear mechanism 7 includes one or more planetary gears 72, it includes three planetary gears 72 in the present embodiment.

Sun gear 71 is an outer gear with a sun teeth portion formed in the outer peripheral surface, and is connected to rotation shaft 22 of motor 2, which is a connection shaft inserted into gear device 1 through center opening 51. Sun gear 71 can rotate with the same axis as rotation shaft 22 through the driving of motor 2. Sun gear 71 includes spiral teeth cut obliquely to the axis of sun gear 71, for example. Sun gear 71 is a so-called helical gear.

Planetary gear 72 is an outer gear with the planetary teeth formed in the outer peripheral surface. The plurality of planetary gears 72 is disposed at even intervals between sun gear 71 and first inner gear 74, and engages with both sun gear 71 and first inner gear 74. The plurality of planetary gears 72, for example, is disposed on the same circle around the axis of first planetary gear mechanism 7, and rotatably supported by first carrier 73. The planetary teeth include spiral teeth cut obliquely to the shaft of planetary gear 72, for example. Planetary gear 72 is a so-called helical gear.

Each planetary gear 72 rotates around its own central axis (planetary shaft part 7344) on the basis of the rotation of sun gear 71. In addition, each planetary gear 72 rotates around sun gear 71 on the basis of its rotation and the engagement with first inner gear 74. The central axis of the rotation of planetary gear 72 may coincide with the central axis of sun gear 71.

First carrier 73 supports planetary gear 72 such that planetary gear 72 is rotatable (on its own axis). Additionally, first carrier 73 rotates on the basis of the rotation of planetary gear 72, and transmits the rotation to second planetary gear mechanism 8. First carrier 73 includes carrier body 732 and carrier cover 734 that engages with carrier body 732.

First carrier 73 is formed in a cylindrical shape with carrier body 732 and carrier cover 734, and houses planetary gear 72 in housing opening 73a formed in its outer peripheral surface. Each planetary gear 72 is supported such that it is rotatable by planetary shaft part 7344 directed to the axis direction in housing opening 73a. A part of planetary gear 72 is attached through housing opening 73a such that it protrudes outward in the radial direction. In this manner, the planetary teeth mesh with the inner teeth of first inner gear 74.

First carrier 73 houses the sun gear and planetary gear 72 in a turnable state, and sun gear 81 of second planetary gear mechanism 8 that rotates around the same axis as the sun gear is fixed to carrier body 732.

Carrier cover 734 is attached from one side in the axial direction with respect to carrier body 732, and supports the shaft of planetary gear 72. Carrier cover 734 is disposed next to housing cover 5 in the axial direction inside housing 4, and is slidable on housing cover 5.

First inner gear 74 is a cylindrical member disposed at the periphery of planetary gear 72, and engages with planetary gear 72 at the first inner teeth provided in the inner peripheral surface. The first inner teeth includes spiral teeth cut obliquely to the central axis (the central axis common to the central axis of rotation shaft 22 of motor 2) of first inner gear 74, and first inner gear 74 is a helical gear.

A plurality (in the present embodiment, three for each of end portions separated in the axial direction) first ridges 741a including outer periphery groove part 741c is provided at the outer peripheral surface of first inner gear 74.

First ridge 741a extends in the circumferential direction. The rotation of first inner gear 74 with respect to housing 4 is limited through the engagement of outer periphery groove part 741c and ridge 451d.

In first inner gear 74, the end portion of first inner gear 74 on one side in the axis direction faces housing cover 5 with a small gap therebetween in the axial direction, in housing 4. The movement to one side in the axial direction is limited to a predetermined amount by housing cover 5.

On the other hand, the end portion of first inner gear 74 on the other side in the axis direction faces a step in housing 4 with a predetermined gap therebetween in the axial direction, and the movement of first inner gear 74 to the other side in the axis direction is limited to a predetermined amount by the step.

Second planetary gear mechanism 8 outputs the rotation transmitted from first planetary gear mechanism 7 after decelerating it at predetermined deceleration ratio. Second planetary gear mechanism 8 is provided on the other side in the axial direction (the output side and the right side of FIG. 1) relative to first planetary gear mechanism 7.

In the housing space of housing 4, second planetary gear mechanism 8 is housed on the other side of body cylindrical part 45 of housing 4 in the axis direction. More specifically, it is disposed at a portion corresponding to second inner gear part 4522 of body cylindrical part 45. Note that second planetary gear mechanism 8 may be omitted.

Second planetary gear mechanism 8 includes sun gear 81, planetary gear 82, and second carrier 83 that rotatably supports planetary gear 82. While second planetary gear mechanism 8 includes three planetary gears 82, it suffices that second planetary gear mechanism 8 includes one or more planetary gears 82.

Sun gear 81 is an outer gear, and includes the sun teeth portion at the outer peripheral surface. In the present embodiment, the sun teeth portion includes spiral teeth cut obliquely to the central axis of sun gear 81, and sun gear 81 is a so-called helical gear. In the present embodiment, sun gear 81 is fixed in the state where each axis line coincides with first carrier 73 of first planetary gear mechanism 7. In this manner, sun gear 81 rotates in the same rotational direction as first carrier 73 and at the same rotational speed as first carrier 73 in association with the rotation of first carrier 73 of first planetary gear mechanism 7 along with the rotation of first carrier 73 of first planetary gear mechanism 7.

Planetary gear 82 is an outer gear with the planetary teeth formed in the outer peripheral surface. The plurality of planetary gears 82 is disposed at even intervals between sun gear 81 and second inner gear part 4522, and engages with both sun gear 81 and second inner gear part 4522. The plurality of planetary gears 82 is disposed on the same circle around the axis of second planetary gear mechanism 8, and is supported by planetary shaft 86 of second carrier 83 in a rotatable manner. In the present embodiment, the planetary teeth include spiral teeth cut obliquely to the axis of planetary gear 82, and planetary gear 82 of the present embodiment is a so-called helical gear.

Each planetary gear 82 rotates around its own central axis (planetary shaft 86) on the basis of the rotation of sun gear 81. In addition, each planetary gear 82 rotates around sun gear 81 on the basis of its own rotation and the engagement with second inner gear part 4522. The central axis of the rotation of planetary gear 82 may coincide with the central axis of sun gear 81.

Second carrier 83 supports planetary gear 82 such that it is rotatable (on its own axis). Additionally, second carrier 83 rotates on the basis of the rotation of planetary gear 82, and transmits it to the output shaft connected to output shaft connecting part 87. Second carrier 83 includes gear holding part 834 and second carrier body 835 that holds output shaft connecting part 87.

Gear holding part 834 includes planetary shaft 86 provided in the axis direction at a ring part disposed at the outer periphery of sun gear 81. Planetary gear 82 is inserted to planetary shaft 86 such that planetary gear 82 is rotatably supported. Gear holding part 834 is joined to second carrier body 835. Each planetary gear 82 is exposed from housing opening 83a formed in the outer peripheral surface of second carrier body 835. The planetary teeth of planetary gear 82 engages with the teeth of second inner gear part 4522 through housing opening 83a.

Output shaft connecting part 87 is provided upright on the other side (output side) than second carrier body 835, and is formed in a cylindrical shape with a smaller size than second carrier body 835. Inside output shaft connecting part 87 in the radial direction, a tooth in a knurling shape is provided and connected to the output shaft.

Housing Cover 5

Housing cover 5 is a member for attaching motor 2 to gear device 1, for example. In addition, housing cover 5 is provided with assembling mechanism 50 that allows for detachable assembling of other housing cover 5A (see FIGS. 8 to 9) having the same configuration as that of housing cover 5.

Housing cover 5 is disposed at one end portion of housing 4 in the axis direction. Housing cover 5 is an annular member, and includes, at the center portion, center opening 51 for disposing rotation shaft 22, which is a connection shaft for planetary gear mechanism (gear). Center opening 51 is disposed to have the same axis with sun gear 71 inside housing 4. Rotation shaft 22 of motor 2 is inserted to center opening 51, and rotation shaft 22 is fixed to sun gear 71 in housing 4.

In housing cover 5, assembling mechanism 50 is provided around center opening 51 of outer surface 5a of housing cover 5.

Housing cover 5 includes annular outer surface part 52, and cylindrical connection cylindrical part 53 protruded in the axial direction from the outer periphery part of outer surface part 52. Outer surface part 52 and connection cylindrical part 53 of housing cover 5 are made of synthetic resin and shaped integrally with each other by injection molding, for example.

Outer surface part 52 is a portion to be fixed to support surface 211 of motor body 21 on outer surface 5a side in the axial direction. Outer surface part 52 is disposed at one end portion of housing 4 in the axis direction, and attached to close the opening at one end portion of housing 4 in the axis direction in the state where center opening 51 is continuous.

Figure 5:
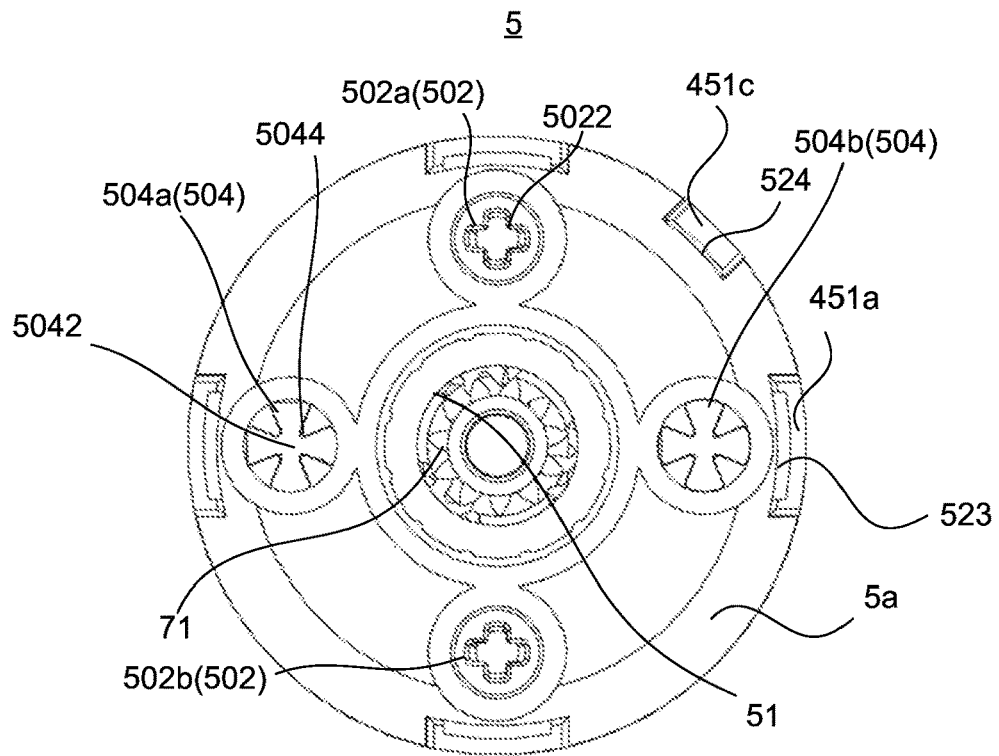
FIG. 5 is a diagram illustrating an outer surface of a housing cover.
Figure 6:
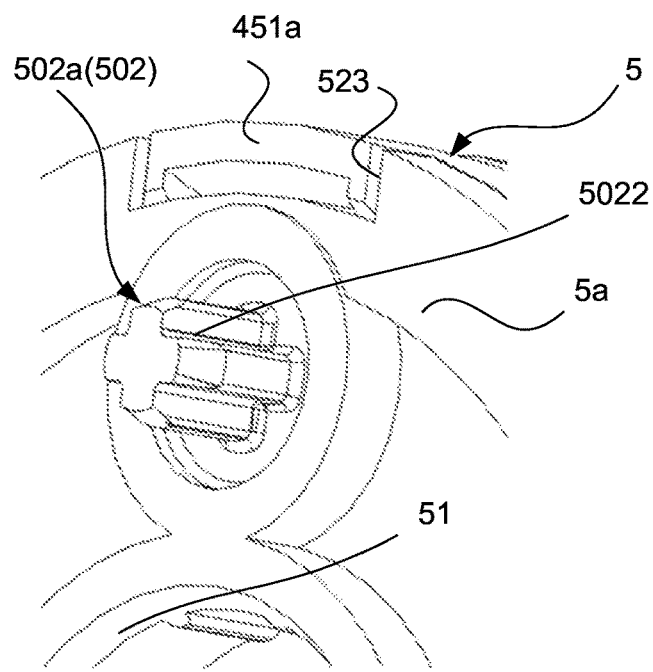
FIG. 6 is a partially enlarged diagram of the housing cover illustrating the engaging part.
Figure 7:
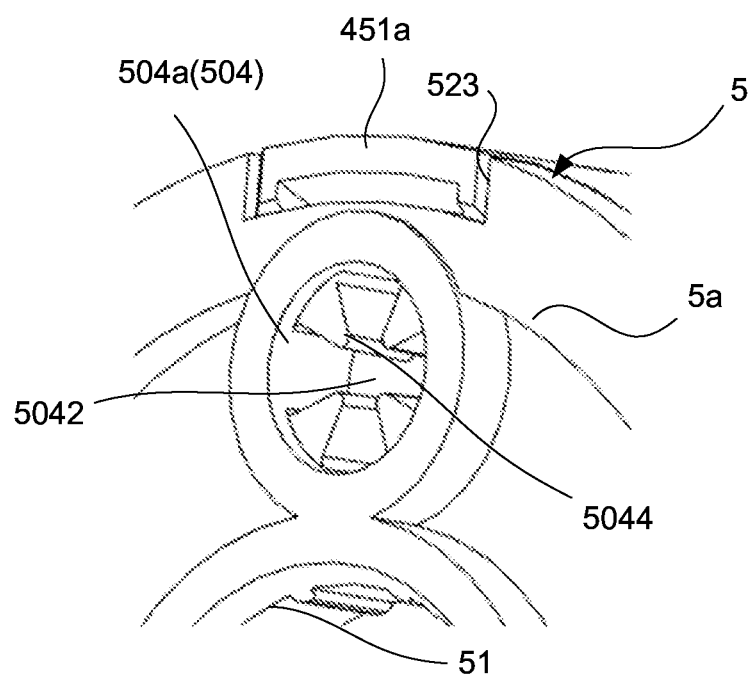
FIG. 7 is a partially enlarged diagram of the housing cover illustrating the engagement part.

FIG. 5 is a diagram illustrating an outer surface of a housing cover, FIG. 6 is a partially enlarged diagram of the housing cover illustrating the engaging part, and FIG. 7 is a partially enlarged diagram of the housing cover illustrating the engagement part.

As illustrated in FIGS. 2, 3, and 5, assembling mechanism 50 includes, at outer surface part 52, engaging part 502 (502a, 502b) and engagement part 504 (504a, 504b) disposed at different positions around center opening 51.

Figure 8:
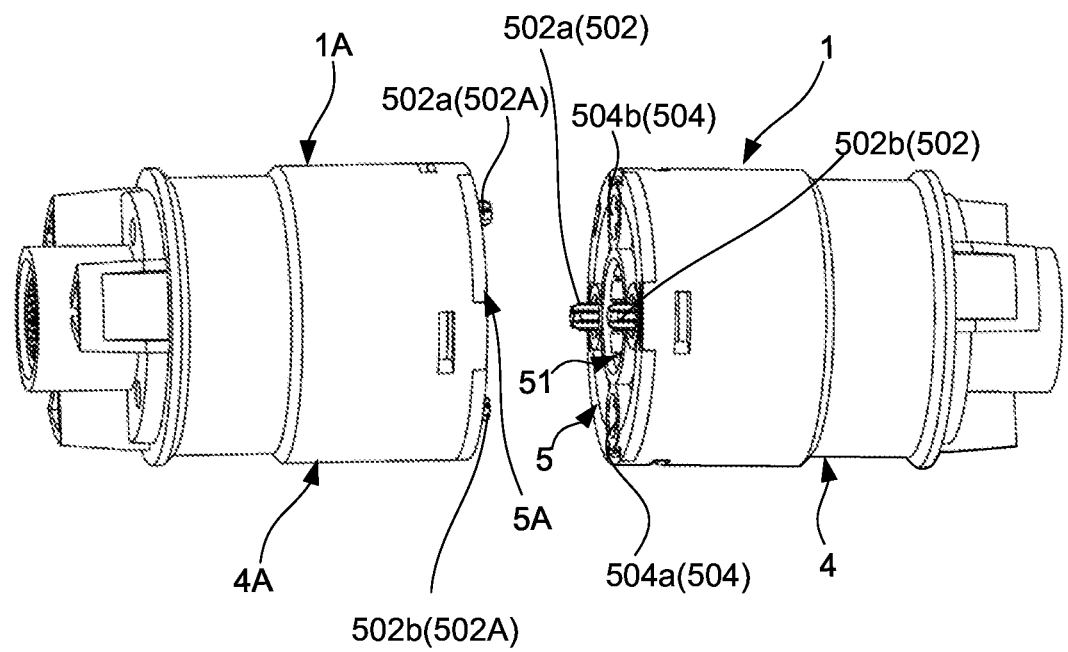
FIG. 8 is a diagram illustrating a packing style of the gear device.

In engaging part 502 and engagement part 504, mutual engaging part 502 and mutual engagement part 504 face each other when outer surface 5a of housing cover 5 and outer surface 5a of other housing cover 5A of other gear device 1A configured in a manner similar to gear device 1 face each other (see FIG. 8). That is, engaging part 502 and engagement part 504 of housing cover 5 are disposed at positions where engaging part 502 and engagement part 504 of other housing cover 5A face each other, and engagement part 504 and engaging part 502A of other housing cover 5A face each other.

For example, each engaging part 502 and each engagement part 504 include two gear side engaging parts 502a and 502b and two gear side engagement parts 504a and 504b, respectively. At outer surface 5a, engaging part 502 and engagement part 504 are alternately provided with intervals of 90° around the axis.

Engaging part 502 is gear side engaging parts 502a and 502b, and are axial direction protrusions formed in a shape protruding in the axial direction from outer surface 5a, which is the outer surface in the axial direction.

A plurality of axis direction recesses 5022 depressed in the axis direction of gear side engaging parts 502a and 502b is provided at the outer periphery of gear side engaging parts 502a and 502b as the axial direction protrusions. With axis direction recess 5022, each of gear side engaging parts 502a and 502b is formed in a cross shape extending in the axial direction.

In addition, gear side engaging parts 502a and 502b are located at positions corresponding to motor side fixation holes 23a and 23b of motor body 21, at outer surface part 52. By inserting (for example, press-fitting) and engaging gear side engaging parts 502a and 502b to fixation holes 23a and 23b, housing cover 5 is fixed to motor 2 in the state where the rotation of housing cover 5, i.e., the rotation of gear device 1 is limited. Note that when gear side engaging parts 502a and 502b engage with fixation holes 23a and 23b, the outer peripheral end parts of gear side engaging parts 502a and 502b make contact with the inner walls of fixation holes 23a and 23b.

On the other hand, engagement part 504 includes axial direction recess 5042 depressed from outer surface 5a in the axial direction. Axis direction recess 5042 of engagement part 504 is formed in a shape that matches engaging part 502. Engagement part 504 is fit with engaging part 502 of other housing cover 5A at axial direction recess 5042, and thus housing cover 5 including engagement part 504 and other housing cover 5A can be assembled.

Engagement part 504 includes gear side engagement parts 504a and 504b, which are disposed in a point symmetrical manner about the shaft part.

A plurality of axis direction protrusions 5044 is provided at the inner periphery of axial direction recess 5042 of each of gear side engagement parts 504a and 504b. Axis direction protrusion 5044 protrudes in the axis direction of axial direction recess 5042, and can be installed in axis direction recess 5022 of other housing cover 5A.

The plurality of axis direction protrusions 5044 forms a cross-shaped space where axis direction recess 5022 fit, for example. It is preferable that the vertexes of the plurality of axis direction protrusions 5044 be formed in shapes such that the interval of vertexes is smaller than that of the base ends, and that they can be press-fit toward the bottom portion of axis direction recess 5022.

Housing cover 5 and other housing cover 5A are detachably assembled by pressing the apex of axis direction protrusion 5044 into axis direction recess 5022 of other housing cover 5A. At this time, the apex of axis direction protrusion 5044 makes pressure contact with axis direction recess 5022 of other housing cover 5A, without making pressure contact with the outer peripheral end part of gear side engaging part 502A of other housing cover 5A. Thus, the apex of axis direction protrusion 5044 does not deform the outer peripheral end part of gear side engaging part 502A of other housing cover 5A, and the fixation of other housing cover 5A to the motor is not destabilized.

In addition, at the outer periphery portion, outer surface part 52 includes a plurality of (the present embodiment, five) recessed engaging recesses 523 and cutout parts 524 cut in the axial direction. Engaging recess 523 and cutout part 524 engage with key protrusion 451c and engaging protrusion 451a of housing 4 in the axial direction.

In addition, outer surface part 52 includes sliding part (see FIGS. 3 and 4) 526 that slides on one end portion of gear mechanism 6, at the other end portion of outer surface part 52 in the axis direction, i.e., surface 5b on housing 4 side.

It is preferable that one of sliding part 526 and one end portion of gear mechanism 6 that slides on sliding part 526 include a cone-shaped part whose diameter varies in the axial direction, and the other include a sliding part that slides on the peripheral surface of the cone-shaped part with the same axis as the axis of the cone-shaped part.

Connection cylindrical part 53 is configured in a cylindrical shape with a plurality of arched wall parts 530 protruded from the outer periphery of housing cover inner surface 5b of outer surface part 52, and extending in the circumferential direction. Connection cylindrical part 53 is provided integrally with outer surface part 52, and includes a plurality of (four, in the present embodiment) engaging claw parts 531 that engages with one end portion of housing 4 in the axis direction at the outer peripheral surface of predetermined arched wall part 530. Connection cylindrical part 53 is connected to housing 4 through engaging claw part 531.

Effect of Gear Device 1

In gear device 1 having the above-mentioned configuration, engaging part 502 and engagement part 504 are provided around center opening 51 at outer surface 5a, which is an end surface provided with center opening 51 where rotation shaft 22 is inserted. That is, gear device 1 includes engaging part 502 and engagement part 504, which are assembling mechanism 50 that can detachably assemble other housing cover 5A with the same configuration as housing cover 5, to housing cover 5 including center opening 51.

Figure 9:
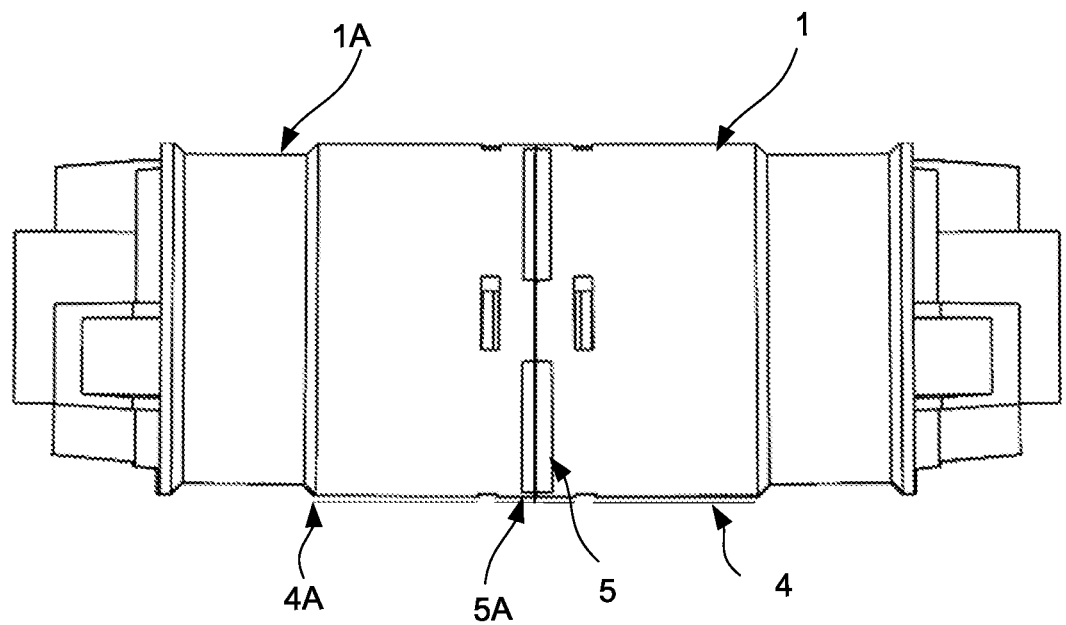
FIG. 9 is a diagram illustrating a packing style of the gear device.

When carrying gear device 1, first, their housing covers 5 and 5A are disposed in an opposite manner by using another gear device 1A, as illustrated in FIGS. 8 and 9. Then, in their housing covers 5 and 5A, one engaging part 502 is fit to the other engagement part 504, and one engagement part 504 is fit to the other engaging part 502. This fitting is achieved through press-fitting in the axial direction, and therefore they are detachable.

As described above, by fitting engaging part 502 of one of housing covers 5 and 5A to engagement part 504 of the other of housing covers 5 and 5A, and fitting one engagement part 504 to the other engaging part 502, center openings 51 of gear devices 1 and 1A are set to a closed state. In this manner, it can be used by attaching it to motor 2 while preventing intrusion and mixing of foreign matters from their center openings 51.

In addition, a separate member such as a cap for sealing center opening 51 during conveyance that becomes unnecessary thereafter is not used, and thus unnecessary members are not produced after the conveyance.

Note that in the present embodiment, engaging part 502 and engagement part 504 as assembling mechanism 50 are fit through press-fitting in the axial direction, but any assembling structure may be employed as long as their center openings are sealed using a gear device with a similar configuration.

For example, it is possible to employ a configuration in which an engaging part and an engagement part with shapes that can be fit each other in the circumferential direction are fit each other by fitting the housing cover of the gear device and the housing cover of the other gear device each other in the axial direction and rotating them in the circumferential direction.

The above is a description of an embodiment of the present invention. The embodiments disclosed here should be considered illustrative in all respects and not restrictive. The scope of the invention is indicated by the claims rather than the description given above, and it is intended that all changes within the meaning and scope of the claims be included. In other words, the above description of the configuration of the device and the shape of each part is an example, and it is clear that various changes and additions to these examples are possible within the scope of the present invention.

INDUSTRIAL APPLICABILITY

The gear device according to the embodiment of the present invention provides an effect of achieving safe conveyance while preventing intrusion and mixture of foreign matters and preventing generation of unnecessary material after the conveyance, and is useful for gear devices that are assembled to the driving part on the job site.

REFERENCE SIGNS LIST 1, 1a Gear device
2 Motor
4 Housing
5, 5a Housing cover
5a Outer surface 5b Surface
6 Gear mechanism
7 First planetary gear mechanism
8 Second planetary gear mechanism
10 Actuator
21 Motor body
22 Rotation shaft
23a, 23b Fixation hole
45 Body cylindrical part
46 Annular part
47 Support cylindrical part
50 Assembling mechanism
51 Center opening
52 Outer surface part
53 Connection cylindrical part
71, 81 Sun gear
72, 82 Planetary gear
73 First carrier
73a, 83a Housing opening
74 First inner gear
83 Second carrier
86 Planetary shaft
87 Output shaft connecting part
211 Support surface
451a Engaging protrusion
451b Housing engaging hole
451c Key protrusion
451d Ridge
502, 502a Engaging part
502a, 502b Gear side engaging part (axial direction protrusion)
504 Engagement part
504a, 504b Gear side engagement part
523 Engaging recess
524 Cutout part
526 Sliding part
530 Arched wall part
531 Engaging claw part
732 Carrier body
734 Carrier cover
741a First ridge
741c Outer periphery groove part
834 Gear holding part
835 Second carrier body
4522 Second inner gear part
5022 Axis direction recess
5042 Axial direction recess
5044 Axis direction protrusion
7344 Planetary shaft part

The invention claimed is:

1. A gear device comprising:
a housing cover having an annular shape and including a center opening configured to dispose a connection shaft for a gear, the housing cover being disposed at one end portion of a housing in an axis direction, the housing cover covering a housing space for the gear from an axial end side, and the housing having a cylindrical shape and configured to house the gear,
wherein at an outer surface of the housing cover, an assembling mechanism configured to detachably assemble another housing cover for another gear device is provided; and
the assembly mechanism comprises: an engaging part that is provided radially inward with respect to an outer periphery of the housing and engages with an engagement part of the another housing cover in the axial direction; and an engagement part that is provided radially inward with respect to the outer periphery of the housing and engages with an engaging part of the another housing cover in the axial direction.

2. The gear device according to claim 1, wherein the assembling mechanism is provided at a periphery of the center opening at the outer surface of the housing cover.

3. The gear device according to claim 2, wherein the assembling mechanism includes an engaging part and an engagement part disposed at different positions at the periphery; and wherein the engaging part and the engagement part are disposed such that when the outer surface of the housing cover and the outer surface of the other housing cover face each other, the engaging part of the housing cover and the engagement part of the other housing cover face each other, and that the engagement part of the housing cover and the engaging part of the other housing cover face each other.

4. The gear device according to claim 3, wherein the engaging part includes an axial direction protrusion protruding in the axial direction from a surface of the outer surface;
wherein the engagement part includes an axial direction recess depressed in the axial direction from the surface of the outer surface; and
wherein when the axial direction protrusion is fit with the axial direction recess of the other housing cover, the housing cover and the other housing cover are assembled.

5. The gear device according to claim 4, wherein a plurality of axis direction recesses depressed in an axis direction of the axial direction protrusion is provided at an outer periphery of the axial direction protrusion;
wherein a plurality of axis direction protrusions protruding in an axis direction of the axial direction recess and configured to be placed in the axis direction recess of the other housing cover is provided at an inner periphery of the axial direction recess; and
wherein the housing cover and the other housing cover are assembled by pressing an apex of the axis direction protrusion into the axis direction recess of the other housing cover.

6. The gear device according to claim 1, wherein the housing cover and the other housing cover have a same configuration.

7. An transportation assembly structure that assembles a first gear device and a second gear device during transportation, the assembly structure comprising:
the first gear device including: a cylindrical first housing that houses a first gear inside; and an annular first housing cover that is disposed at one end of the first housing in an axial direction, and has a central opening configured for a connection shaft for connecting a drive source and the first gear, and
the second gear device including: a cylindrical second housing that houses a second gear inside; and an annular second housing cover that is disposed at one end of the second housing in the axial direction, and has a central opening configured for another connecting shaft for connecting another drive source and the second gear, wherein
the first housing cover and the second housing covers are each provided with a assembly mechanism on an outer surface of one end side of each of the first and second housing covers, wherein
the assembly mechanism is configured to close central openings of the first housing cover and the second housing cover by detachably engaging the first housing cover and the second housing cover with outer circumferences thereof offset by a predetermined angle with respect to an axis center and fitted together.

* * * * *